US012647333B2

(12) United States Patent
Schornig et al.

(10) Patent No.: US 12,647,333 B2
(45) Date of Patent: *Jun. 2, 2026

(54) QUALITY OF EXPERIENCE POLICY ENGINE FOR CUSTOM APPLICATIONS BASED ON FEEDBACK

(71) Applicant: Cisco Technology, Inc., San Jose, CA (US)

(72) Inventors: Eduard Schornig, Haarlem (NL); Grégory Mermoud, Venthône (CH); Jean-Philippe Vasseur, Combloux (FR); Pierre-André Savalle, Rueil-Malmaison (FR); Michal Wladyslaw Garcarz, Cracow (PL)

(73) Assignee: Cisco Technology, Inc., San Jose, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/597,691

(22) Filed: Mar. 6, 2024

(65) Prior Publication Data

US 2025/0286794 A1 Sep. 11, 2025

(51) Int. Cl.
| | |
|---|---|
| *H04L 41/5019* | (2022.01) |
| *H04L 41/5009* | (2022.01) |
| *H04L 41/5067* | (2022.01) |

(52) U.S. Cl.
CPC ...... *H04L 41/5019* (2013.01); *H04L 41/5009* (2013.01); *H04L 41/5067* (2013.01)

(58) Field of Classification Search
None
See application file for complete search history.

(56) References Cited

U.S. PATENT DOCUMENTS

| | | | | |
|---|---|---|---|---|
| 10,225,313 | B2 * | 3/2019 | Arunachalam ..... | H04M 3/2218 |
| 10,511,708 | B2 * | 12/2019 | Rangarajan ......... | H04L 41/5025 |
| 10,601,869 | B2 | 3/2020 | Joch et al. | |
| 10,680,919 | B2 | 6/2020 | Mermoud et al. | |
| 10,783,188 | B2 | 9/2020 | Wang | |
| 10,841,167 | B2 * | 11/2020 | Ganjam ................. | H04L 65/80 |
| 10,862,771 | B2 * | 12/2020 | Tomkins ................ | H04L 69/22 |

(Continued)

OTHER PUBLICATIONS

Ahmad A., et al., "Supervised Learning based QoE Prediction of Video Streaming in Future Networks: A Tutorial with Comparative Study", Jan. 3, 2022, 7 Pages.

(Continued)

*Primary Examiner* — Ranodhi Serrao
(74) *Attorney, Agent, or Firm* — Lee & Hayes, P.C.

(57) ABSTRACT

In one embodiment, a method herein may comprise: causing, for a quality-of-experience evaluation session, one or more network impairments to be injected according to a set of predefined scenarios on application traffic for a plurality of feedback sources that are using a particular application in a computer network; obtaining experience-based feedback from the plurality of feedback sources for the quality-of-experience evaluation session; correlating the experience-based feedback with the one or more network impairments to produce an evaluation result for the quality-of-experience evaluation session; and generating a quality-of-experience-based network policy recommendation for the particular application based on the evaluation result.

20 Claims, 13 Drawing Sheets

(56) References Cited

U.S. PATENT DOCUMENTS

| | | | | |
|---|---|---|---|---|
| 10,897,424 | B1 * | 1/2021 | Dhanabalan | H04L 45/306 |
| 11,062,231 | B2 | 7/2021 | Cagadas et al. | |
| 11,140,207 | B2 * | 10/2021 | Pennarun | H04L 43/50 |
| 11,234,048 | B2 | 1/2022 | Arpirez Vega et al. | |
| 11,283,737 | B2 | 3/2022 | Parekh et al. | |
| 11,379,522 | B2 | 7/2022 | Zade et al. | |
| 11,456,926 | B1 | 9/2022 | Mermoud et al. | |
| 2008/0155087 | A1 * | 6/2008 | Blouin | H04L 41/5006 |
| | | | | 709/223 |
| 2016/0065419 | A1 * | 3/2016 | Szilagyi | G06F 11/3006 |
| | | | | 709/224 |
| 2018/0270347 | A1 * | 9/2018 | Rangarajan | H04L 41/5067 |
| 2019/0037002 | A1 * | 1/2019 | Arunachalam | H04M 7/1285 |
| 2019/0199772 | A1 * | 6/2019 | Pennarun | H04L 43/50 |
| 2019/0222491 | A1 * | 7/2019 | Tomkins | H04L 41/0823 |
| 2021/0029043 | A1 * | 1/2021 | Dhanabalan | H04L 41/0894 |
| 2021/0044530 | A1 * | 2/2021 | Dhanabalan | H04L 45/308 |
| 2021/0211347 | A1 * | 7/2021 | Vasseur | H04L 43/0876 |
| 2021/0234773 | A1 * | 7/2021 | Maggiore | H04L 41/5009 |
| 2021/0314238 | A1 * | 10/2021 | Cioffi | H04L 41/5067 |
| 2022/0045917 | A1 | 2/2022 | Uppili et al. | |
| 2022/0045959 | A1 | 2/2022 | Chauhan | |
| 2022/0237567 | A1 | 7/2022 | Tiwari et al. | |

OTHER PUBLICATIONS

Gomez G., et al., "Towards a QoE-Driven Resource Control in LTE and LTE-A Networks", Hindawi Publishing Corporation, Journal of Computer Networks and Communications, vol. 2013, Article ID 505910, Jan. 9, 2013, pp. 1-15.

International Telecommunication Union: "Series G: Transmission Systems and Media, Digital Systems and Networks, International Telephone Connections and Circuits—Transmission Planning and the E-Model, The E-Model: A Computational Model for Use in Transmission Planning", ITU-T Telecommunication Standardization Sector of ITU, G.107, Jun. 29, 2015, 30 pages.

Katz D., et al., "Bidirectional Forwarding Detection (BFD)", Internet Engineering Task Force (IETF), Jun. 2010, pp. 1-49.

* cited by examiner

900

```
bfd app-route multiplier 6
bfd app-route poll-interval 30000 sla-class SalesforceSLA
    loss      5
    latency  150
    jitter   100
  !

app-route-policy ApplicationAwareRouting
    sequence 11
     match
       app-list Salesforce
     !
    action
     sla-class SalesforceSLA
     !
     !
```

FIG. 9

QUALITY OF EXPERIENCE POLICY ENGINE FOR CUSTOM APPLICATIONS BASED ON FEEDBACK

TECHNICAL FIELD

The present disclosure relates generally to computer networks, and, more particularly, to a quality of experience (QoE) policy engine for custom applications based on feedback.

BACKGROUND

The Internet and the World Wide Web have enabled the proliferation of web services available for virtually all types of businesses or applications. Due to the accompanying complexity of the infrastructure supporting the services, it is becoming increasingly difficult to maintain the highest level of service performance and user experience to keep up with the increase in web services.

Modern enterprise solutions, such as software-defined wide area network (SD-WAN), Secure Access Service Edge (SASE), and Security Service Edge (SSE), empower network administrators with new functionality such as application visibility, network performance monitoring, and flexible policy configuration. Building on these new capabilities, traffic steering techniques such as Application-Aware Routing (AAR) have become increasingly common in enterprise networks.

However, one of the major challenges faced by network administrators today pertains to how to define the service level agreement (SLA) threshold values for each application, e.g., what values of loss, latency, and jitter are certain to guarantee that users will have an excellent experience.

In particular, given the lack of currently available tooling or guidance for evaluating quality of experience (QoE) for these types of enterprise applications, policy configuration ends up being driven by arbitrary choices regarding what SLA thresholds should be used and over how long of a time window they should be measured without any concrete understanding how these may affect user experience for critical applications in real life networks.

BRIEF DESCRIPTION OF THE DRA WINGS

The embodiments herein may be better understood by referring to the following description in conjunction with the accompanying drawings in which like reference numerals indicate identically or functionally similar elements, of which:

FIG. 9 illustrates an example of a QOE policy configuration recommendation.

DESCRIPTION OF EXAMPLE EMBODIMENTS

Overview

According to one or more embodiments of the disclosure, a method herein may comprise: causing, for a quality-of-experience evaluation session, one or more network impairments to be injected according to a set of predefined scenarios on application traffic for a plurality of feedback sources that are using a particular application in a computer network; obtaining experience-based feedback from the plurality of feedback sources for the quality-of-experience evaluation session; correlating the experience-based feedback with the one or more network impairments to produce an evaluation result for the quality-of-experience evaluation session; and generating a quality-of-experience-based network policy recommendation for the particular application based on the evaluation result.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
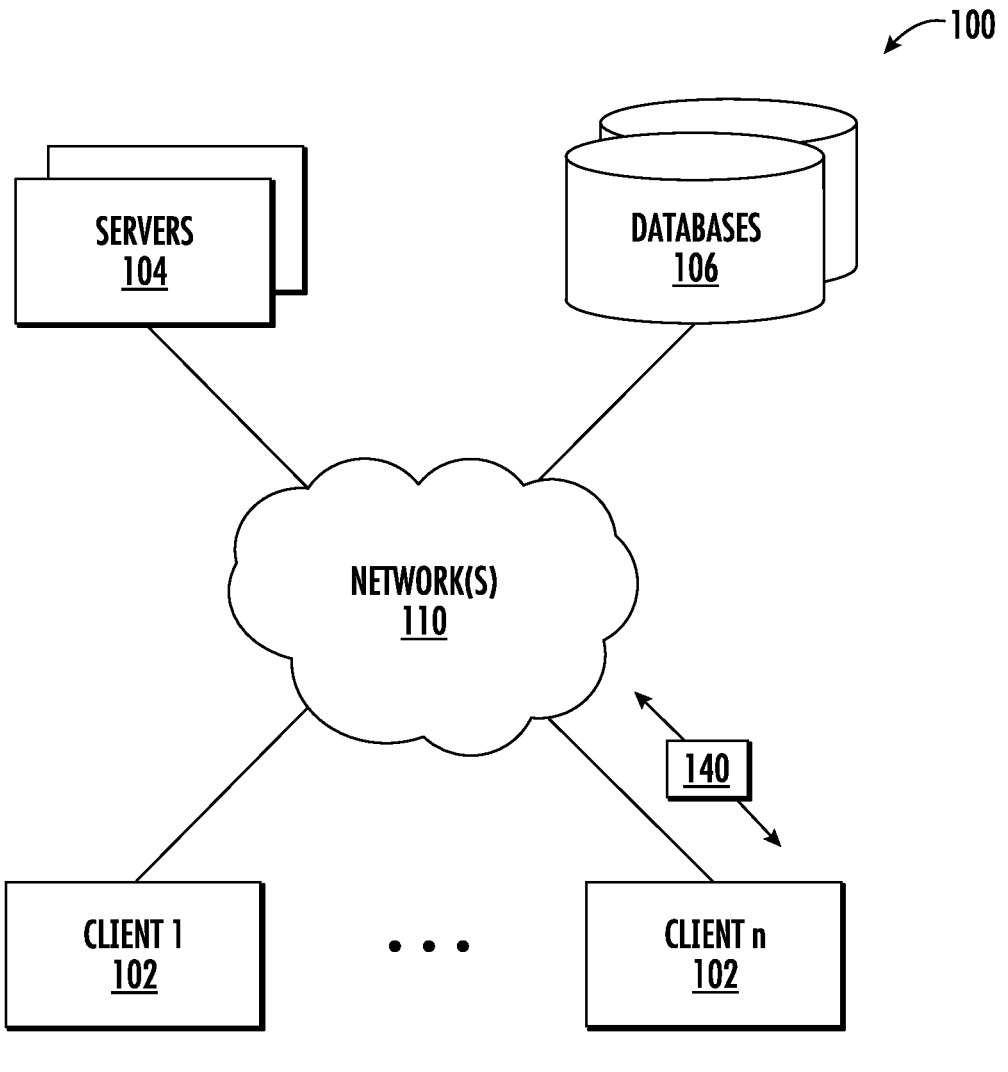
FIG. 1 illustrates an example computing system.

FIG. 1 is a schematic block diagram of an example simplified computing system (e.g., computing system 100) illustratively comprising any number of client devices (e.g., client devices 102, such as a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, the devices shown and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Network(s) 110 may include, for example, network backbones or other internetworking systems, and may include various customer edge (CE) routers interconnected with provider edge (PE) routers in order to communicate across a core network to provide connectivity between devices which may be located in different geographical areas and/or on different types of local networks (e.g., local/branch networks versus data center/cloud environments). For example, these routers may be interconnected by the public Internet, a multiprotocol label switching (MPLS) virtual private network (VPN), or the like. In some implementations, a router or a set of routers may be connected to a private network (e.g., dedicated leased lines, an optical network, etc.) or a VPN (e.g., MPLS VPN) thanks to a carrier network, via one or more links exhibiting different network and service level agreement characteristics.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art. Servers 104, for example, may be configured as a network controller/supervisory service located in a data center with databases 106, accordingly. For instance, servers 104 may include, in various implementations, a network management server (NMS), a dynamic host configuration protocol (DHCP) server, a constrained application protocol (CoAP) server, an outage management system (OMS), an application policy infrastructure controller (APIC), an application server, etc.

Those skilled in the art will also understand that any number of nodes, devices, links, etc. may be used in computing system 100, and that the view shown herein is for simplicity. As would also be appreciated, computing system 100 may include any number of local networks, data centers, cloud environments, devices/nodes, servers, etc. Also, those skilled in the art will further understand that while the network is shown in a certain orientation, the computing system 100 is merely an example illustration that is not meant to limit the disclosure.

For instance, smart object networks, such as sensor networks, in particular, are a specific type of network (e.g., computing system 100) having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Generally, size and cost constraints on smart object nodes (e.g., sensors) result in corresponding constraints on resources such as energy, memory, computational speed and bandwidth.

In some implementations, the techniques herein may be applied to still other network topologies and configurations. For example, the techniques herein may be applied to peering points with high-speed links, data centers, etc.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

According to various implementations, a software-defined WAN (SD-WAN) may be used in computing system 100 to connect local networks and data center/cloud environments. In general, an SD-WAN uses a software defined networking (SDN)-based approach to instantiate tunnels on top of the physical network and control routing decisions, accordingly. For example, one tunnel may connect a customer edge (CE) router at the edge of a local network to router a remote CE router at the edge of a data center/cloud environment over an MPLS or Internet-based service provider network in a network backbone. Similarly, a second tunnel may also connect these routers over a 4G/5G/LTE cellular service provider network. SD-WAN techniques allow the WAN functions to be virtualized, essentially forming a virtual connection between local networks and data center/cloud environments on top of the various underlying connections. Another feature of SD-WAN is centralized management by a supervisory service that can monitor and adjust the various connections, as needed.

Figure 2:
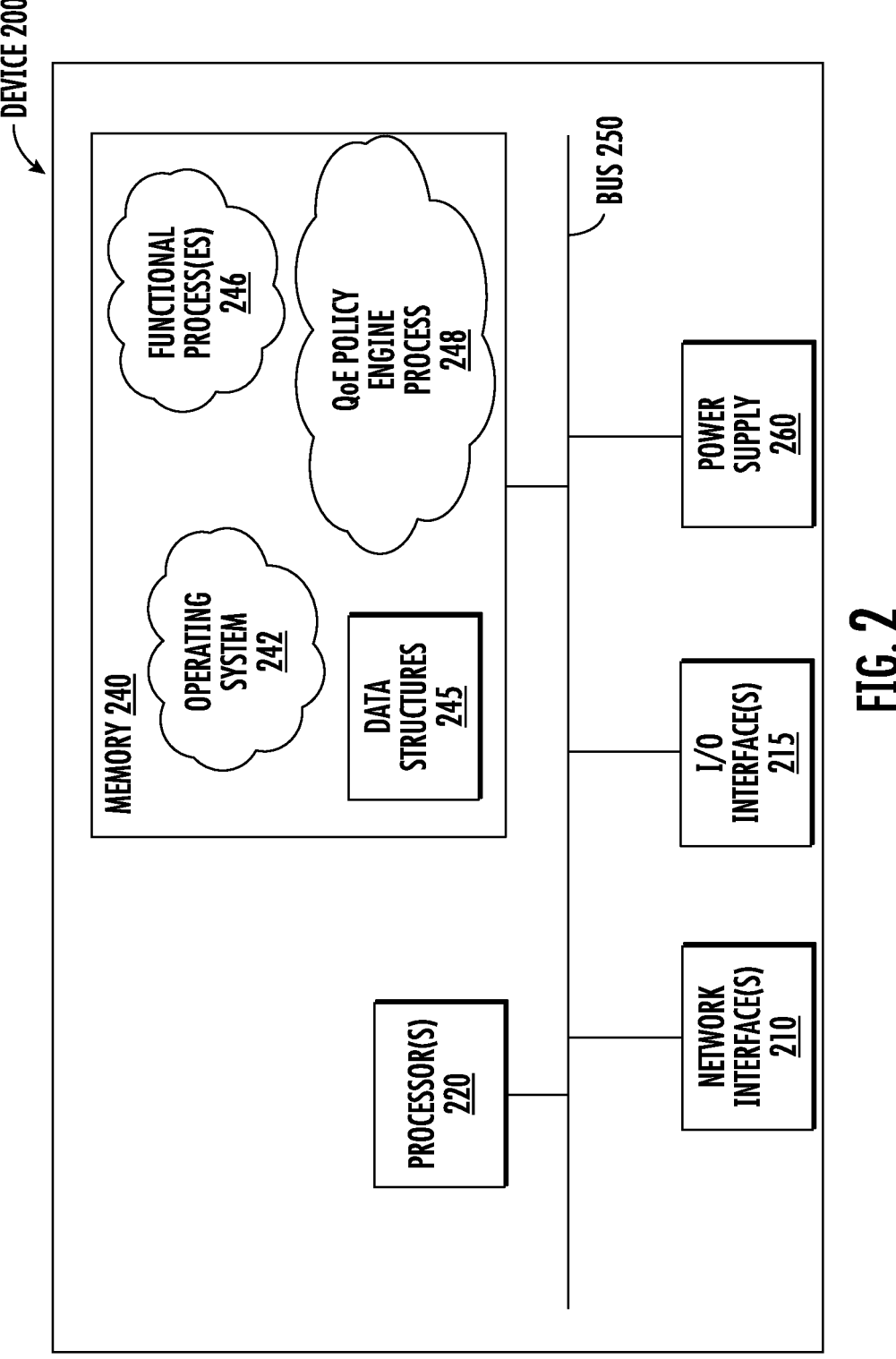
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), input/output interfaces (I/O interfaces 215, inclusive of any associated peripheral devices such as displays, keyboards, cameras, microphones, speakers, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise one or more functional processes 246, and on certain devices, a Quality of Experience (QoE) policy engine process (process 248), as described herein, each of which may alternatively be located within individual network interfaces.

Notably, one or more functional processes 246, when executed by processor(s) 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

For instance, one or more functional processes 246 may include computer executable instructions executed by the processor(s) 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, the one or more functional processes 246 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, one or more functional processes 246 and/or QoE policy engine process (process 248) may include computer executable instructions that, when executed by processor(s) 220, cause device 200 to perform the techniques described herein. To do so, in some implementations, one or more functional processes 246 and/or process 248 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a^*x+b^*y+c$ and the cost function would be the number of misclassified points. The learning process then operates by adjusting the parameters a, b, c such that the number of misclassified points is minimal. After this optimization phase (or learning phase), model M can be used very easily to classify new data points. Often, M is a statistical model, and the cost function is inversely proportional to the likelihood of M, given the input data.

In various implementations, one or more functional processes 246 and/or process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that one or more functional processes 246 and/or process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, one or more functional processes 246 and/or process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, one or more functional processes 246 and/or process 248 may use a generative model to generate synthetic network traffic based on existing user traffic to test how the network reacts. Example generative approaches can include, but are not limited to, generative adversarial networks (GANs), large language models (LLMs), other transformer models, and the like. In some instances, one or more functional processes 246 and/or process 248 may be executed to intelligently route LLM workloads across executing nodes (e.g., communicatively connected GPUs clustered into domains).

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives to the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different quality of service (QOS) at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
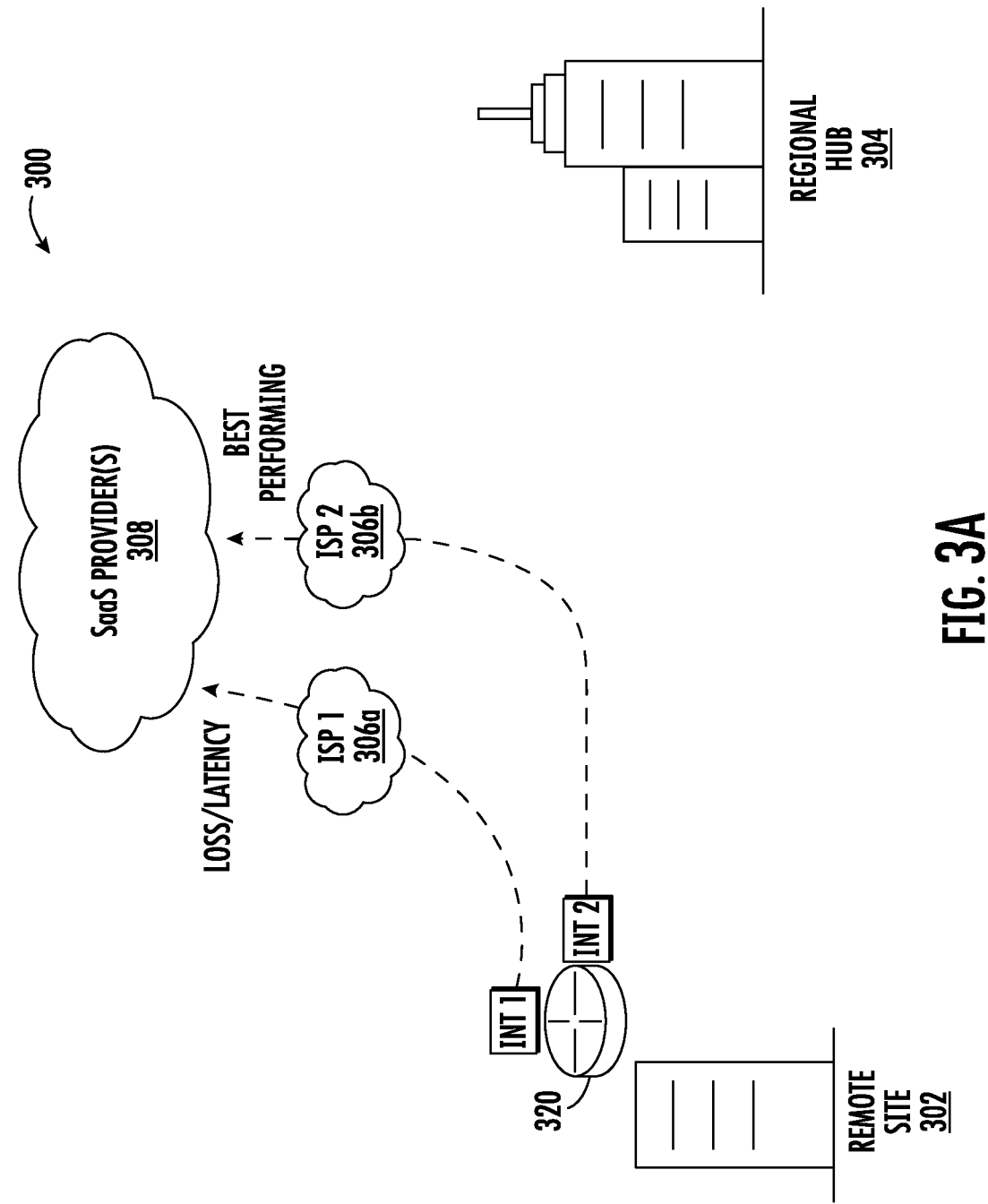
FIGS. 3A-3B illustrate example network deployments.
Figure 3B:
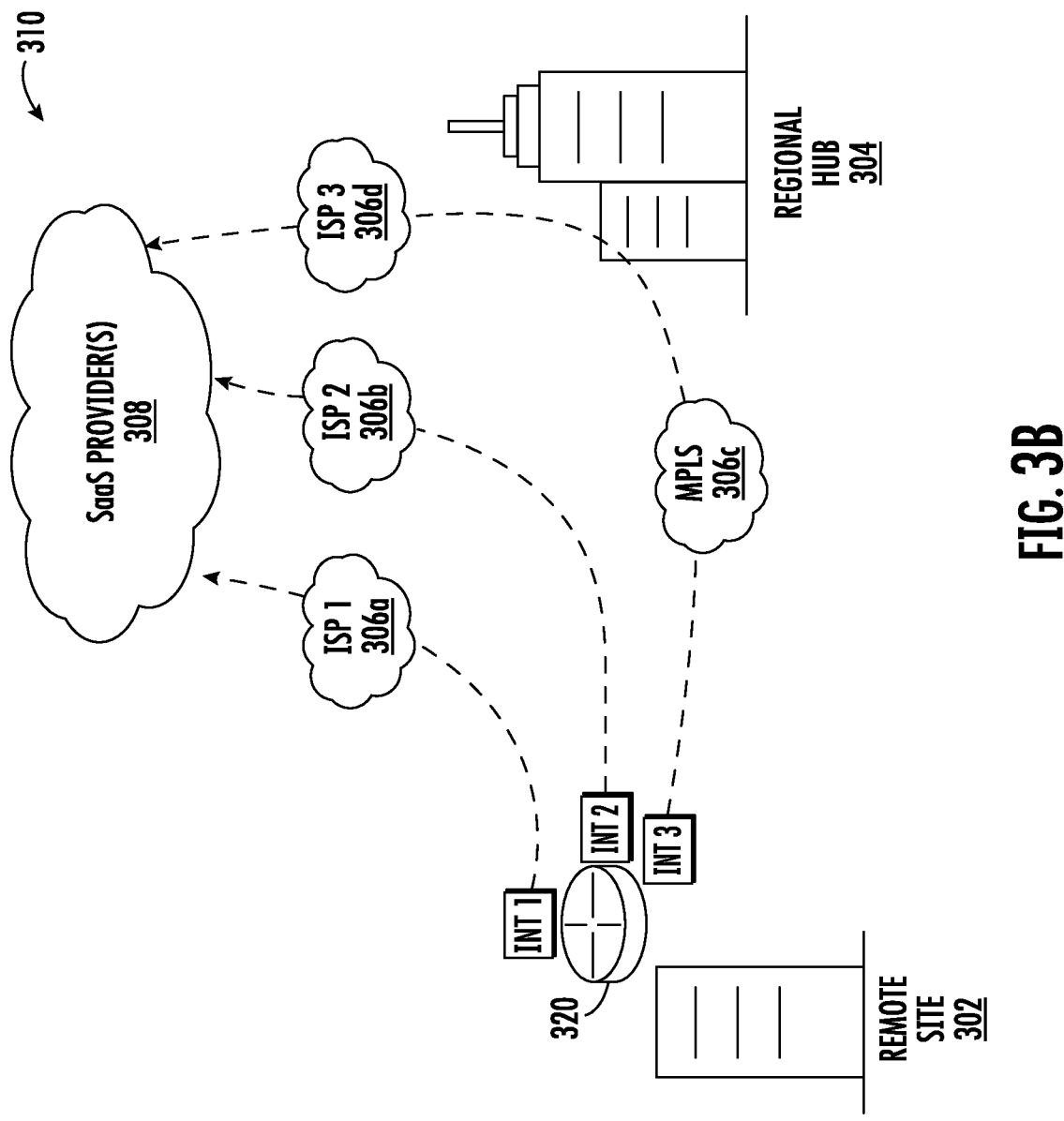

FIGS. 3A-3B illustrate example network deployments (network deployment 300, network deployment 310, respectively). As shown, a router 320 located at the edge of a remote site 302 may provide connectivity between a local area network (LAN) of the remote site 302 and one or more cloud-based, SaaS provider(s) 308. For example, in the case of an SD-WAN, router 320 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and a SaaS provider. For example, as shown in network deployment 300 in FIG. 3A, router 320 may utilize two Direct Internet Access (DIA) connections to connect with SaaS provider(s) 308. More specifically, a first interface of router 320 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 320, Int 2, may establish a backhaul path with SaaS provider(s) 308 via a second ISP 306b, denoted ISP 2 in FIG. 3A.

FIG. 3B illustrates another network deployment 310 in which Int 1 of router 320 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 320 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
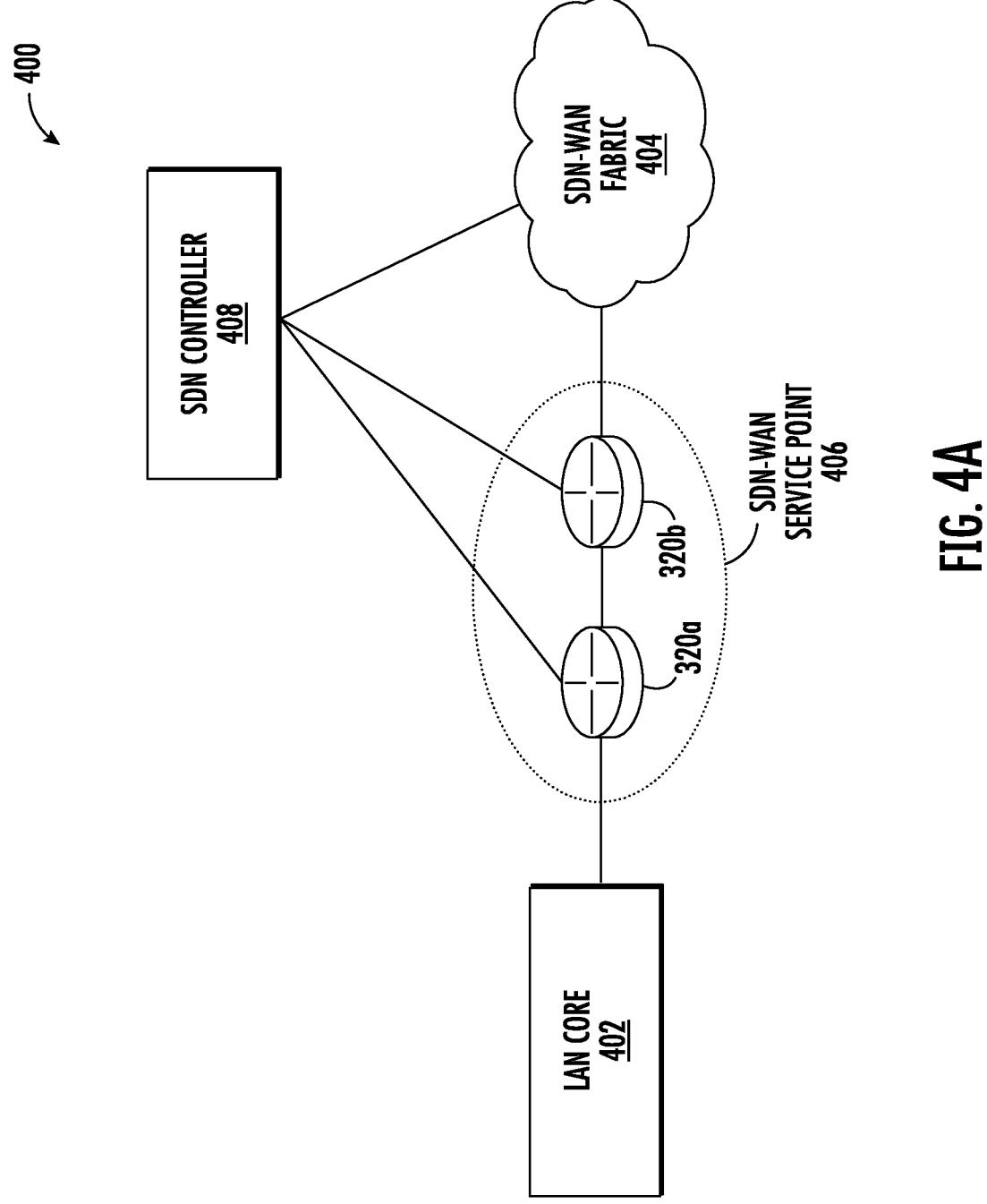
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service (e.g., one or more functional processes 246), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging a SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc, drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network, DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address.

In particular, various attempts have been made to extend the notion of routing, CSPF, link state routing protocols (ISIS, OSPF, etc.) using various metrics (e.g., Multi-topol-ogy Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application, Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
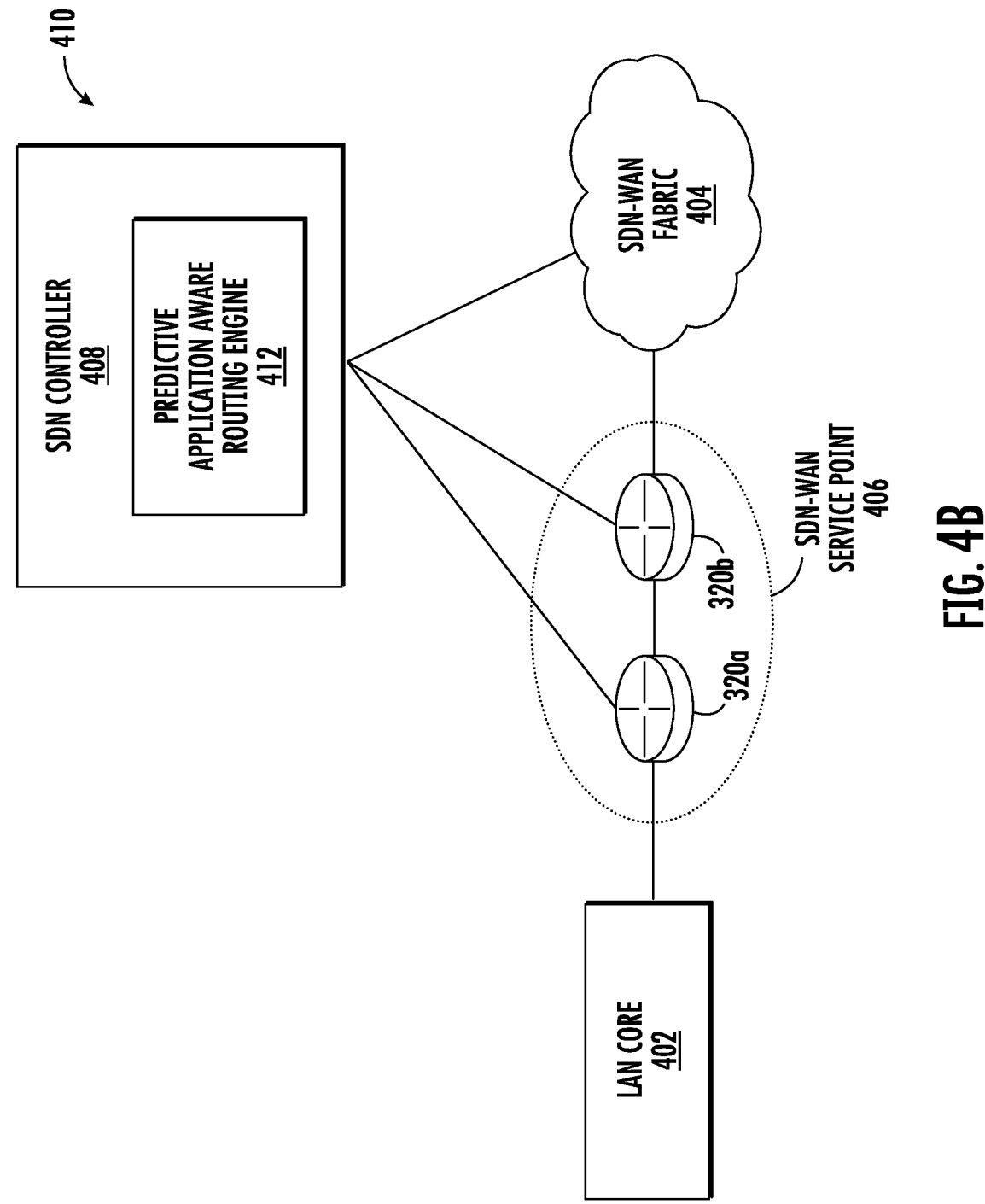

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of QoE assessment process, process 248), Further embodiments provide for predictive application aware routing engine 412 to be hosted on a router or at any other location in the network.

During execution, predictive application aware routing engine 412 makes use of a high volume of network and application telemetry (e.g., from routers 320a-320b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, predictive networking engines, such as predictive application aware routing engine 412, seek to select the best path from among a plurality of paths P1, P2, . . . , PN such that end users of a given online application, either SaaS-delivered (e.g., WebEx, Zoom, O365, Salesforce, SAP, etc.) or datacenter-hosted (and monitored via tools such as Datadog, AppDynamics, etc.) have the best experience possible. In the context of SD-WAN, these paths may be probed for liveness and basic path QoS metrics (e.g., loss, latency, jitter, throughput, etc.) at the network level (L3), typically using technologies such as Bidirectional Forwarding Detection (BFD) probing.

However, actively probing the QoS metrics of the network paths reveals little about the actual experience of the end user. Indeed, while the path performance may be considered degraded from a networking perspective, an end user of an application may not even notice a change in their overall application experience (e.g., due to the codecs in use by the application, the ability of the application to adapt to network problems, etc.). As a result, networks today are primarily optimized using metrics such as mean opinion score (MOS) metrics, that are only vague approximations or proxies of what is thought to be the real end user experience. Furthermore, such proxies do not account at all for the inherently subjective nature of the application experience, which may be perceived differently by different users, and are not customized in any way to the individual end users. Said differently, there is a very poor understanding today of what the actual experience of an application user is.

In particular, in recent years, enterprise networks have been undergoing a fundamental transformation where users and applications have become increasingly distributed while technologies (such as SD-WAN) have enabled unprecedented flexibility in terms of network architecture and underlay connectivity options.

At the same time, collaboration applications~critical for day-to-day business operations, have moved from on-premises deployment to a SaaS Cloud delivery model which allows application vendors and rapidly deploy and take advantage of the latest and most novel techniques and codecs that can be used to increase robustness of media content.

In this highly dynamic environment, the ability of network administrators to understand the impact of network performance (or lack of) on media applications quality of experience (QoE) and ensuring Service Level Agreements (SLAs) is becoming increasingly challenging.

How much do developers know about "user experience" and "networking actions that should be taken in order to improve user experience"? For decades the answer to the first question has been entirely relying on network Key Performance Indicator (KPIs) such as delay, loss, and jitter for which hard boundaries should not be exceeded in order to meet the application SLA. In the example of voice, the usual SLA boundaries are 150 ms for Delay, 50 ms for Jitter and a maximum of 3% of packet loss. Unfortunately, such values are highly debatable. Moreover, the measurements granularity is usually left unspecified making the values totally irrelevant. A path experiencing a constant delay of 120 ms for voice over a period of 10 minutes provides a very different user experience than a path with the same average delay that keeps varying between 20 ms and 450 ms The dynamics of such KPIs is even more critical for packet loss and jitter in the case of voice and video traffic (e.g., 10s of 80% packet loss would severely impact the user experience although averaged out over 10 s would give a low value totally acceptable according to the threshold). Without a doubt, the user experience requires a more subtle and accurate approach to determine the networking requirements a path should meet in order to maximize the user satisfaction, capturing local phenomenon (e.g., effects on delay, jitter, and loss at higher frequencies) but also telemetry from upper layers (applications). For years the concept of layers isolation has been a core principle of the Internet. Such an approach allowed for avoiding layer dependency (e.g., often referred to as layer violation) at a time where several protocols and technologies were developed at each layer, thus enabling the design and deployment of new layers (e.g. PHY, MAC, etc.) independent of each other, allowing the Internet to scale. Still, with modern applications requiring tight SLAs a cross-layer approach is highly desirable. The answer to the second question is equally challenging and remains unanswered. Although the effect of specific actions at a given layer of the networking stack on user experience can be qualitatively evaluated, being able to precisely quantify it is often unknown: determining that voice quality is low along a highly congested path may be relatively easy but by how much should the bandwidth be increased or the weight of the queue used for voice be tuned in order to increase the user experience score?

Cognitive Networks introduce a new approach, where instead of taking a siloed approach where networking systems poorly understand user satisfaction, focus on a single layer, and poorly connect with networking actions, Cognitive Networks are fully driven by understanding user experience (cognition) using cross-layer telemetry and ground truth user feedback in order to determine which networking actions can optimize the user experience. To that end a rich set of telemetry sources are gathered along with labeled user feedback to train Machine Learning model used to predict (for forecast) the user experience (aka QoE). Such a holistic approach end-to-end across layers is a paradigm shift to how networks have been designed and operated since the early days of the Internet.

—QoE Policy Engine for Custom Applications based on Feedback—

As noted above, modern enterprise solutions, such as software-defined wide area network (SD-WAN), Secure Access Service Edge (SASE), and Security Service Edge (SSE), empower network administrators with new functionality such as application visibility, network performance monitoring, and flexible policy configuration. Building on these new capabilities, traffic steering techniques such as Application-Aware Routing (AAR) have become increasingly common in enterprise networks.

AAR, as the name implies, allows network administrators to configure complex traffic steering policies that match individual (or groups of) applications with service level agreement (SLA) profiles as to ensure traffic is only routed on network paths that comply with predefined loss, latency, and jitter thresholds. One example of such policy can be formulated as: voice traffic should only traverse network paths that comply with the following SLA profile definition:

latency=<150 ms,
jitter<=50 ms,
loss<=3%.

Ultimately the goal of AAR is to optimize the traffic forwarding decisions for critical applications as to ensure a high level of user experience.

However, as also noted above, one of the major challenges faced by network administrators today pertains to how to define the SLA threshold values for each application, e.g., what values of loss, latency, and jitter are certain to guarantee that users will have an excellent experience. For example, would user experience for collaboration applications be impacted when latency is higher than 150 ms? 200 ms? Today, there is no common approach for finding the right threshold values. Various articles and protocols have been authored to provide some general guidance in terms of application tolerance to loss, latency and jitter, but either no specific values are provided, or concrete guidance is given for only limited applications (e.g., voice only) and have been derived by using codec implementations that have been long superseded in modern-day applications and as such are largely no longer relevant.

Newer methodologies of evaluating quality of experience (QoE) for audio and video applications, for example, involve asking real human users to rate the quality of offline media recordings corresponding to various network impairment scenarios. The media files are recorded in specially designed emulation environments and are submitted for offline evaluation to publicly available crowd-sourced data labeling services. While this approach has been demonstrated to work very well for QoE evaluation in the case of audio/video applications, its offline nature (i.e., users evaluating pre-recorded media files) does not translate well to other types of applications that may be used in enterprise environments which can be custom in nature. In particular, enterprises often rely on a multitude of in-house developed proprietary applications and business tools which require prior domain-level knowledge of application behavior and the execution of real day-to-day tasks in an interactive (online) fashion in order to accurately evaluate the QoE impact of various network degradations.

As also noted above, given the lack of currently available tooling or guidance for evaluating QoE for these types of enterprise applications, policy configuration ends up being driven by arbitrary choices regarding what SLA thresholds should be used and over how long of a time window they should be measured without any concrete understanding how these may affect user experience for critical applications in real life networks.

The techniques herein, therefore, provide a QoE policy engine for custom applications based on feedback that generalizes the evaluation of QoE for different types of applications and tools, e.g., used in enterprise environments, extending to custom or in-house developed apps, by defining application-specific SLA thresholds using live user feedback collected in online evaluation sessions and subsequently generating network policy configuration. That is, the techniques herein introduce a set of mechanisms for defining application-specific SLA thresholds for enterprise applications, which can often be custom or in-house developed, by using live feedback collected during online evaluation sessions conducted by users with prior knowledge of application behavior and subsequently generating network policy configuration based on the collected feedback.

QoE evaluation sessions may be conducted inside the enterprise environment, where application traffic from real enterprise users is redirected to network proxies where diverse types of network conditions and impairments are emulated. Experienced users, with prior domain knowledge, may then be asked to perform common day-to-day tasks within each application of interest and provide feedback (labels) about the impact of each scenario on quality of experience (QoE) (e.g., as a score from 1 for "bad" to 5 for "excellent"). The collected QoE labels, along with other potential constraints defined by the network administrator, such as the minimum desired QoE level, may then be ingested by a policy engine that identifies the appropriate values for the SLA thresholds and produces a recommended policy configuration. The process can be repeated at periodic intervals as to make adjustments for application configuration or workflow changes. Such an approach allows for determining what those thresholds should be using user feedback potentially with different values for different regions.

Specifically, according to one or more embodiments of the disclosure as described in detail below, a method herein may comprise: causing, for a quality-of-experience evaluation session, one or more network impairments to be injected according to a set of predefined scenarios on application traffic for a plurality of feedback sources that are using a particular application in a computer network; obtaining experience-based feedback from the plurality of feedback sources for the quality-of-experience evaluation session; correlating the experience-based feedback with the one or more network impairments to produce an evaluation result for the quality-of-experience evaluation session; and generating a quality-of-experience-based network policy recommendation for the particular application based on the evaluation result.

Figure 5:
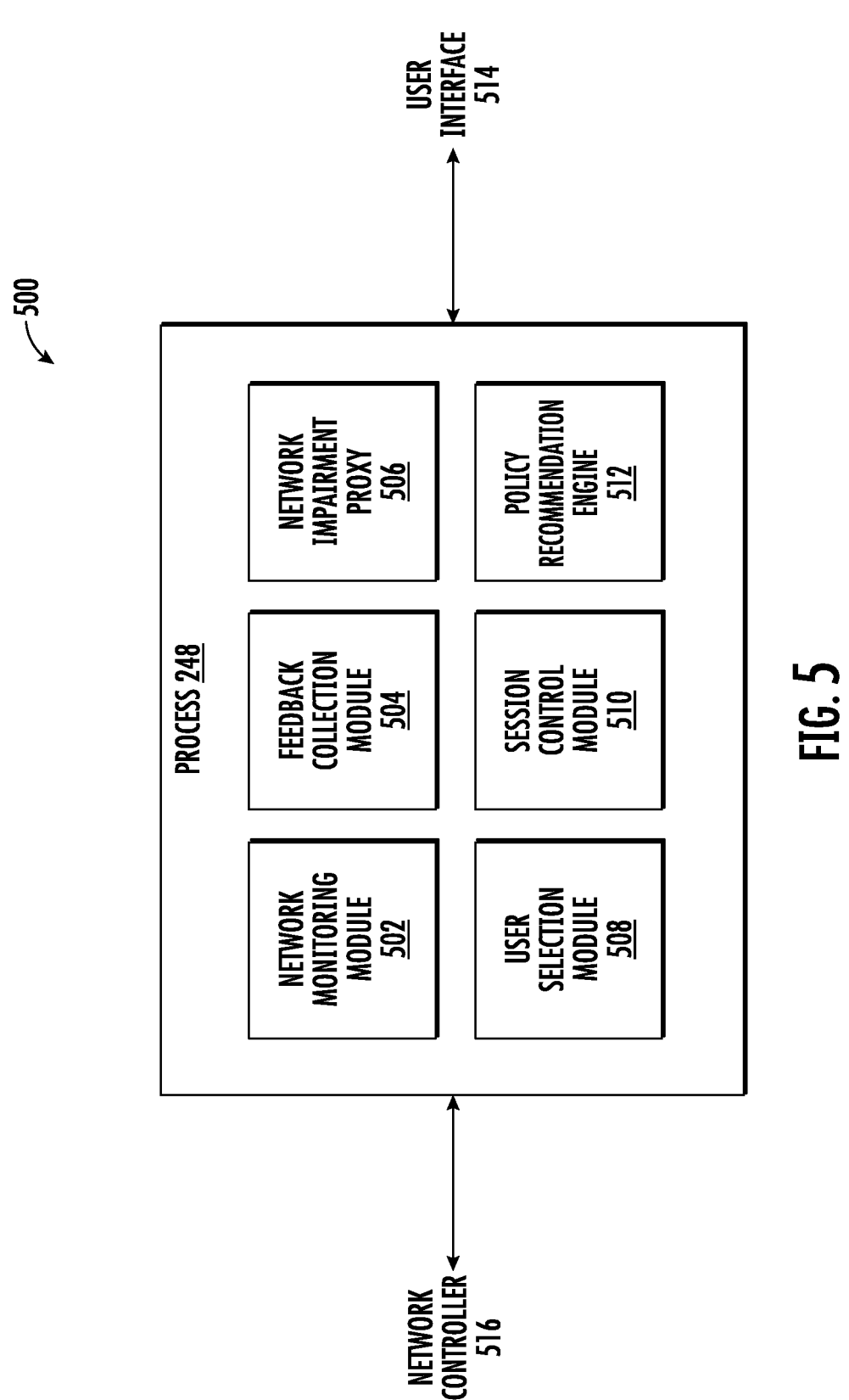
FIG. 5 illustrates an example architecture for a quality of experience (QoE) policy engine for custom applications based on feedback.

FIG. 5 illustrates an example architecture (architecture 500) for a QoE policy engine for custom applications based on feedback, according to various implementations. At the core of architecture 500 is QoE policy engine process (process 248), which may be executed by a controller for a network or another device in communication therewith. For instance, process 248 may be executed by a controller for a network (e.g., SDN controller 408 in FIGS. 4A-4B, a network controller in a different type of network, etc.), a particular networking device in the network (e.g., a router, a firewall, etc.), another device or service in communication therewith, or the like. In some embodiments, for instance, QoE policy engine process (process 248) may be used to implement a predictive application aware routing engine, such as predictive application aware routing engine 412, or another supervisory service for the network. In other embodiments, QoE policy engine process (process 248) may be used to implement a reactive routing approach in the network, e.g., in conjunction with one or more functional processes 246, as described above.

As shown, QoE policy engine process (process 248) may include any or all of the following components: network monitoring module 502, a feedback collection module 504 or "FCM", a network impairment proxy 506 or "NIP", a user selection module 508 or "USM", a session control module 510 or "SCM", a policy recommendation engine 512 or "PRE", and a user interface 514 or "UI". As would be appreciated, the functionalities of these components may be combined or omitted, as desired (e.g., implemented as part of process 248). In addition, these components may be implemented on a singular device or in a distributed manner, in which case the combination of executing devices can be viewed as their own singular device for purposes of executing a process 248. Also, QoE policy engine process (process 248) may be in communication with one or more user interfaces (user interface 514) and one or more network controllers 516, accordingly.

The techniques herein may rely on an external user feedback dataset or mechanism to collect user feedback on application quality-of-experience. This dataset combines network and application telemetry with feedback, also referred to as "labels". The data can be collected by polling the users about their subjective experience during an application session and then matching each collected label with the session telemetry recorded prior to the feedback. For example, certain implementations of the techniques herein may collect direct user experience metrics for an online application via a chatbot, which may be integrated directly into the online application (e.g., Webex, Slack, WhatsApp bots, etc.). In other words, a chatbot may act as a relay between the network and end users of a given application, querying live feedback about their experience.

Illustratively, certain aspects of a system in accordance with the techniques herein may associate one or more performance metrics with a particular session of an online application, and may obtain feedback from users regarding their application experience, such as by causing a chatbot to query the user for feedback regarding their application experience. The techniques herein may then associate the feedback from the user regarding their application experience with the one or more performance metrics.

In particular, network monitoring module 502 may monitor the traffic of users of an online application in (near) real-time (e.g., continuously), in some embodiments. In general, the role of network monitoring module 502 is to identify when users of a given online application are active and, optionally, obtain a (rough) assessment of the quality of service provided by the network for their sessions. To this end, network monitoring module 502 may typically be hosted on a network device (a router, wireless LAN controller, etc.) or a network controller (e.g., DNA Center, vManage, etc.) and process network telemetry related to the application traffic and path QoS. For instance, such telemetry may take the form of NetFlow records, BFD probing results, IP-SLA information, or the like. In further embodiments, another form of telemetry that network monitoring module 502 may obtain could be application-level metrics measured by the application itself. For instance, such application-level metrics may include metrics such as application-measured loss, latency, jitter, concealment time, codec statistics, audio/video bitrates, or the like. For instance, the application itself may provide this telemetry to network monitoring module 502 via an application programming interface (API) or other mechanism. In some instances, network monitoring module 502 may also be cloud-hosted and process the application-level telemetry, directly. Further embodiments provide for multiple network monitoring modules to be implemented at different locations, as well.

Feedback collection module 504, in various embodiments, may be responsible for collecting user feedback in a variety of manners, such as by presenting a chatbot to the user interface of select users, or by a simple rating, ranking, or "thumbs up" or "thumbs down" vote. In various embodiments, such a feedback engine may be integrated directly into the online application itself or presented via a separate agent or other mechanism. For instance, assume that the online application is Webex. In such a case, feedback collection module 504 may cause a chatbot or other feedback mechanism to be displayed to a selected videoconference user.

Feedback collection module 504 may use different strategies to collect the feedback, such as any or all of the following, in various embodiments:

Classical surveying with a 1-to-5 stars rating or similar. This is useful in case of random surveys and/or when the system has a poor estimate of the experience (e.g., upon bootstrapping the system).

Direct yes/no question—e.g., "It seems you are having a very bad time with O365. Am I correct?" This is useful when the system has a good estimate of the user experience and wants to establish trust. Ideally, such queries should be accompanied of a tip or piece of advice to resolve the situation such as "You may improve your experience by switching to cellular," "You are now using a 5G link, are you seeing any improvement in term of experience during this call?" or the like.

In further embodiments, feedback collection module 504 may also leverage natural language interactions, either initiated by the chatbot or not.

Once feedback collection module 504 has collected the actual user feedback regarding their application experiences, it may associate this information with the telemetry obtained by network monitoring module 502. For instance, in the case of process 248 being used to implement predictive application aware routing engine 412, shown previously, the feedback could be used as ground truth information for purposes of training a predictive model to predict whether the application experience is acceptable or not, given the network-level and/or application-level telemetry that is available. Such associations can also be used for purposes of presenting information to a network operator (e.g., by showing the operator the effects of a configuration change or event on the application experience of users, etc.).

Optionally, network monitoring module 502 may also include state collector agent, which collects and stores more detailed state information about networking devices (e.g., edge devices, routers, switches) at the time a feedback request was sent by feedback collection module 504 to a user, in some embodiments. Such states are often of the utmost importance for models in charge of predicting and/or forecasting application QoE. In addition to the telemetry collected by network monitoring module 502, which is designed to be quite sparse and lightweight, a state collector agent may send instructions to the various networking elements/devices (e.g., routers, switches) along the path followed by the application traffic (e.g., number of hops, types of links, links state, congestion level, error rates, etc.), to collect more detailed information about their state. Typically, such detailed information could not be collected by network monitoring module 502 in the first place because of scaling issues. More specifically, network monitoring module 502 will typically process all telemetry, whereas a state collector agent (whether a part of network monitoring module 502 or a separate module) may be used selectively obtain information for flows associated with user feedback. In addition, network monitoring module 502 may also interact with other mechanisms, to train the machine learning models of a predictive routing engine, to predict application QoE (e.g., as described in greater detail below) and/or by performing closed-loop control over the network. Should such mechanisms require additional input features, a state collector agent component of network monitoring module 502 could be used to gather this state information.

Figure 6:
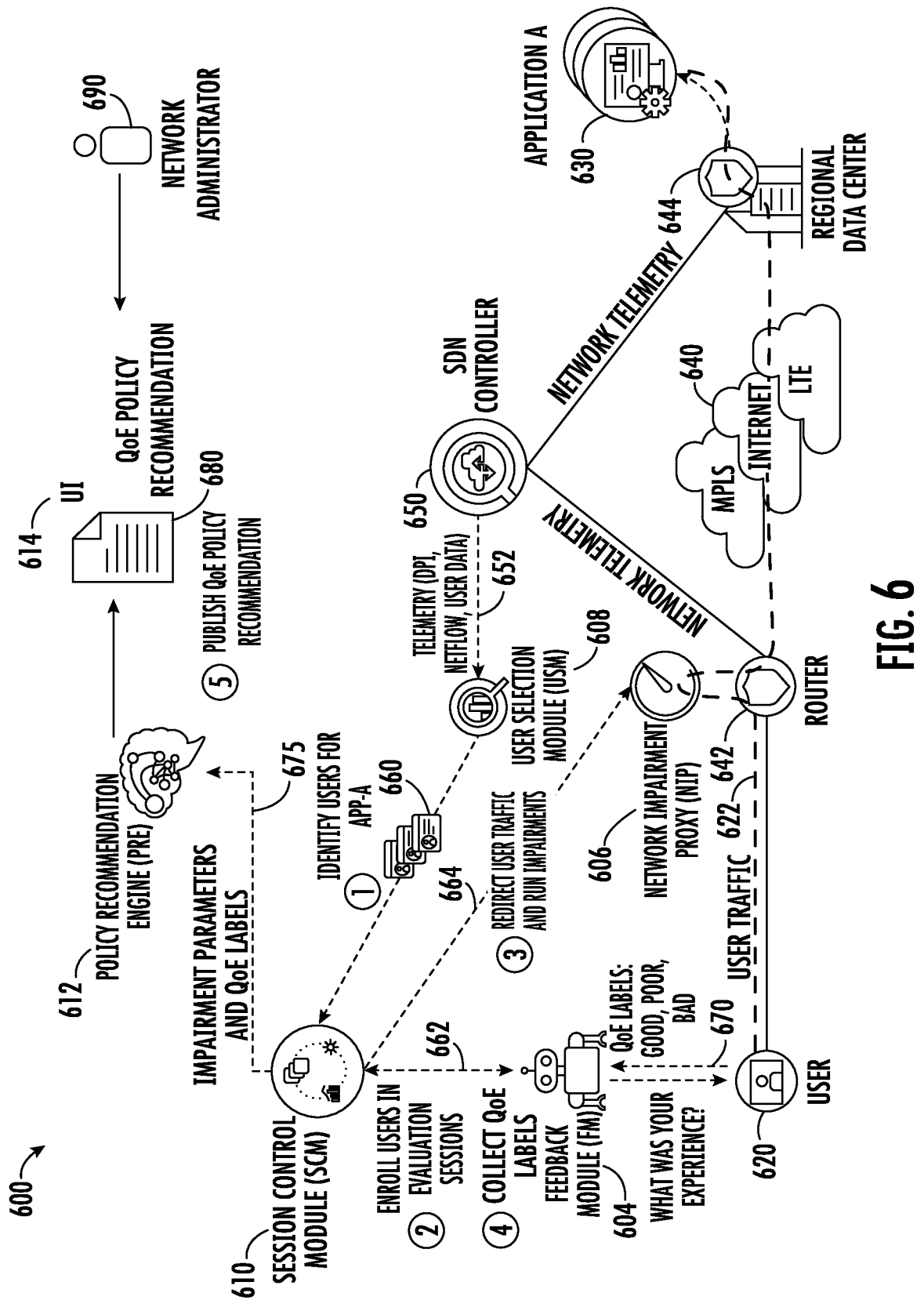
FIG. 6 illustrates an example of a system-level architecture in which a QoE policy engine for custom applications based on feedback may operate.

Operationally, FIG. 6 illustrates an example of a system-level architecture 600 in which a QoE policy engine for custom applications based on feedback may operate, according to various implementations. From a high-level, and as described in greater detail below, a user 620 communicates user traffic 622 for an application 630 ("Application A" or "App A") via various networks 640 (e.g., MPLS, Internet, LTE, etc.) and associated routers (e.g., router 642 connecting the user to the various networks 640 and router 644 connecting a regional data center with the application 630 to the various networks). An SDN controller 650 may monitor and share network telemetry 652 (e.g., Netflow, deep packet inspection (DPI), user data, etc.) with a user selection module 608 (e.g., which can be analogous to the user selection module 508 above), which, in illustrative step "1", shares the identity 660 of users for the application 630 with session control module 610 (which can be analogous to the session control module 510 above). Session control module 610 then establishes a communication 662 with a feedback module 604 (which can be analogous to the feedback collection module 504 above) to enroll selected users in evaluation sessions (illustrative step "2"). Session control module 610 may also establish another communication 664 with a network impairment proxy 606 (which can be analogous to the network impairment proxy 506) in an illustrative step "3" to cause the network impairment proxy 606 to redirect user traffic and run impairments on the user traffic 622 via router 642 (as described below). Feedback module 604 may then query the user 620 for their experience feedback to receive QoE labels 670 (e.g., good, poor, bad, etc.) for the collection of QoE labels for session control module 610 (illustrative step "4"), which sends the impairment parameters and QoE labels over communication 675 to policy recommendation engine 612 (which can be analogous to the policy recommendation engine 512 above). The policy recommendation engine 612 may then publish a QoE policy recommendation 680 on a UI 614 (which can be analogous to user interface 514 above) for consumption by a network administrator 690 or other system (illustrative step "5").

In greater detail now for each of the components associated with the techniques herein, the network impairment proxy 506 (or also network impairment proxy 606), or simply "NIP", acts as man-in-the-middle device between the end user (evaluator) and the target application. During evaluation sessions, the NIP intercepts end user traffic and injects network impairments according to a set of predefined scenarios. Test scenarios can be composed of impairment patterns based on a single isolated metric (e.g., high latency) or a combination of metrics (e.g., high latency and packet loss), and/or various time distributions (e.g., continuous, seasonal, or random patterns).

Figure 7A:
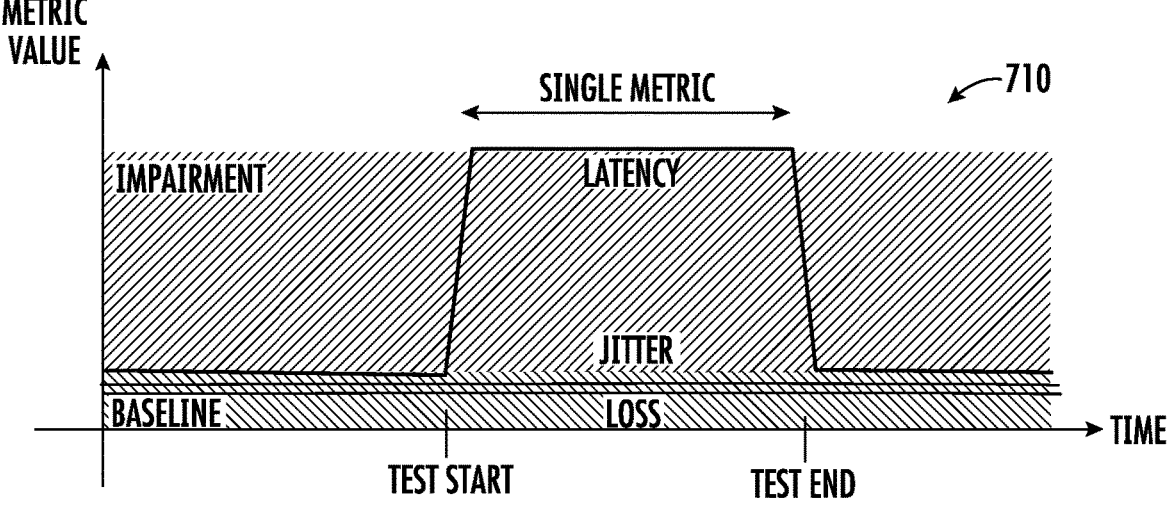
FIGS. 7A-7D illustrate examples of different types of impairment scenarios that can be injected according to the techniques herein.
Figure 7B:
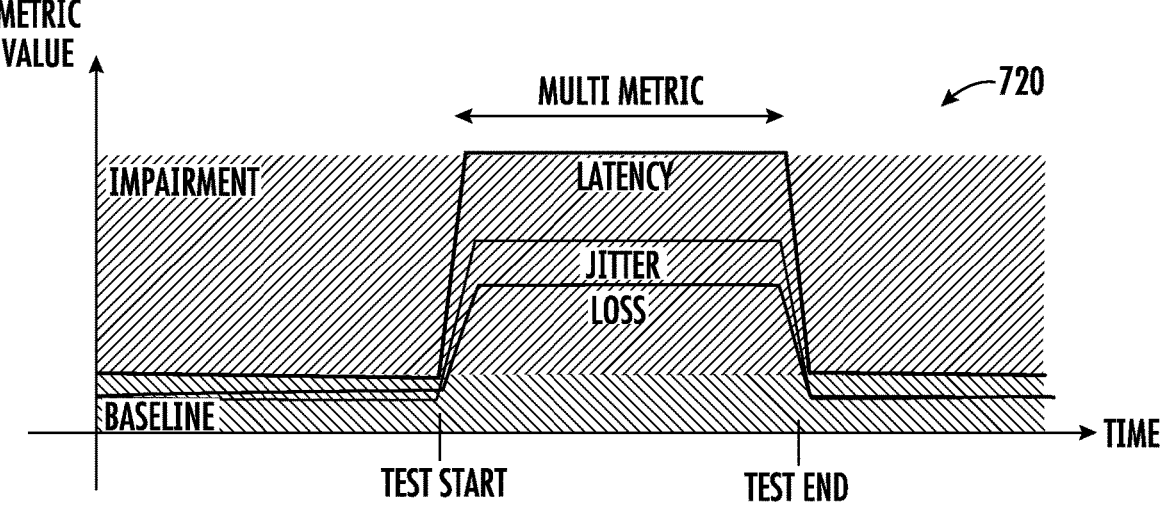
Figure 7C:
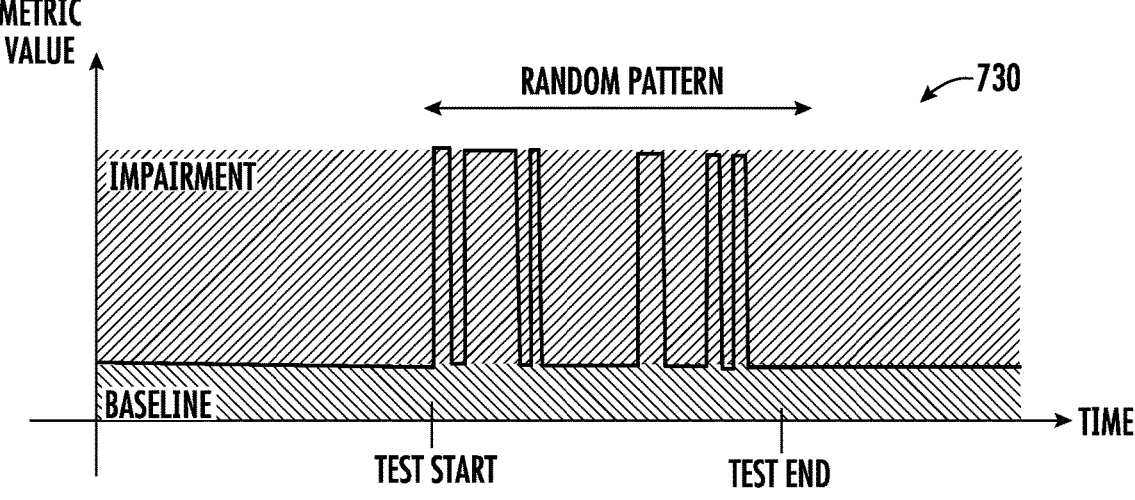
Figure 7D:
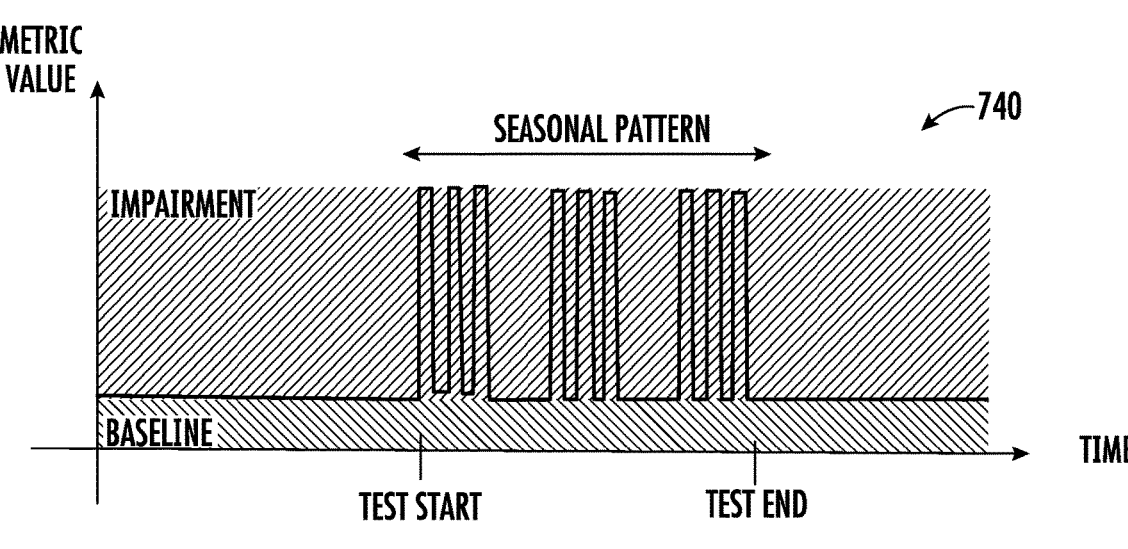

FIGS. 7A-7D illustrate examples of different types of impairment scenarios that can be injected according to the techniques herein. For instance, FIG. 7A shows an impairment 710 based on a single isolated metric (e.g., high latency) above a baseline between a test start and a test end, while FIG. 7B shows an impairment 720 as a combination of metrics (e.g., high latency, high jitter, and high packet loss). In addition, FIG. 7C shows an impairment 730 with a random pattern for time distribution, while FIG. 7D shows an impairment 740 with a seasonal pattern. Other impairments, including combinations of any of the above, may be used in accordance with the techniques herein, and those shown in FIG. 7A-7D are merely examples for illustration.

According to certain implementations herein, before starting test scenarios, the NIP measures the unaltered network conditions (e.g., using ICMP or HTTP probes), both between itself and target application as well as between itself and the end user. The results may then be used to dynamically adjust the test parameters. For example, if a test requires the evaluation of QoE against a threshold of 200 ms latency, and the existing user to application latency is 100 ms, then only 100 ms of extra latency will be injected. Conversely, if the measured user to app latency was 50 ms, the NIP would inject 150 ms of extra latency. The same operation can be repeated also at periodic intervals during the test and periodic adjustments to the test parameters can be made.

The ability to dynamically compensate for preexisting network conditions allows flexible placement in relation to the users such as data centers or hub sites, or even the use of public cloud infrastructure (infrastructure as a service, IaaS) to instantiate NIP instances.

One particular component of the NIP consists in determining where in the network the proxies should be configured and/or enabled. In a first embodiment, proxies may be placed in locations that are representative of the locations where users are located, potentially with multiple proxies in locations where users are distributed across a large region. In a second embodiment, such proxies may be selected on-the-fly should many users complain about a poor user experience in order to determine if the thresholds should be adjusted. For example, if the number of users complaining about poor QoE increases in New York, this may be because the thresholds used in this region for the given application are too high and should be reduced. Conversely, if too many alarms are raised although no users complain for a given region/application the system may decide to install a proxy so as to determine whether the thresholds should be increased.

The feedback collection module 504 (or also feedback module 604), or simply "FCM, has the responsibility to notify users that they have been enrolled in a QoE evaluation session and request feedback after each specific impairment scenario is executed. The FCM can take the form of a chatbot as described above, and interacts with evaluators (the users) over the preferred collaboration application, such as Webex Teams using a series of predefined message cards. Alternatively, a dedicated client application can be used.

An initial message card can be used to notify users they are requested to take part in a QoE evaluation session as well as provide a description of the scope, duration of the session along with potential instructions followed by an explicit acknowledgment requested before the session can start as to avoid situations where users are enrolled in evaluation sessions even though they might not have seen or read the initial notification.

At the end of each impairment scenario, the FCM asks users to rate the QoE during each scenario. The QoE can be quantified as a score from 1 (bad) to 5 (excellent), or through other more relevant application-specific scales (e.g., a binary assessment of whether the experience is acceptable or not). In the case of low QoE scores, follow-up questions can be used to gather more insights into what caused the poor score. Note that no information need be provided about the impairment scenario (blind evaluation) to avoid any bias in the evaluation.

According to the techniques herein, user selection module 508 (or user selection module 608), or simply "USM", is responsible for identifying a list of users best suited to participate in evaluation sessions for each application of interest. To this end the USM can integrate with existing network services manager systems to analyze historical flow telemetry (e.g., DPI, Netflow, etc.) and identify the top users based on activity (e.g., time spent using the application) and volume of traffic. Furthermore, the USM may also integrate with ticketing systems and identify users that have previously reported poor QoE issues.

Using this approach, the USM can ensure that the selected users are familiar with the applications to be evaluated and they already have domain expertise on what constitutes "good" or "bad" QoE for a particular application.

Session control module 510 (or session control module 610), or simply "SCM", and has the role of orchestrating the execution of the evaluation sessions and collection of user feedback by coordinating the work of the PSM, FCM, and NIP modules. To achieve this goal, the SCM will:

Trigger the PSM to identify the list of candidate users for evaluating QoE for each application of interest.

Request the FCM module to notify the users that they have been requested to participate in QoE evaluation sessions and provide feedback.

Redirect user traffic to a NIP service instance. This task can be accomplished in several ways, however most modern SDN controllers have the capability to instantiate service chaining policies that allow traffic flows to be redirected to a different device than originally intended, which in this case is closest NIP instance.

Finally, instruct the NIP service instance to run various impairment scenarios and collect user feedback via the FCM module.

To fulfill its function more efficiently, the SCM may implement a function that allows it to dynamically optimize the search space for each KPI after each run.

Figure 8:
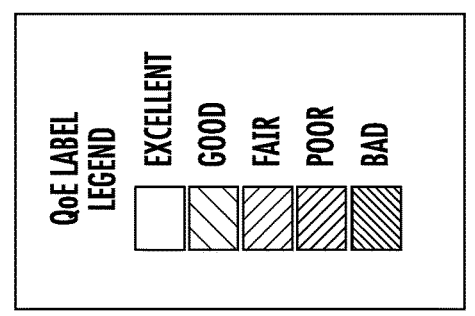
FIG. 8 illustrates an example of a search latency pattern across consecutive evaluation sessions and associated QoE labels.
Figure 8:
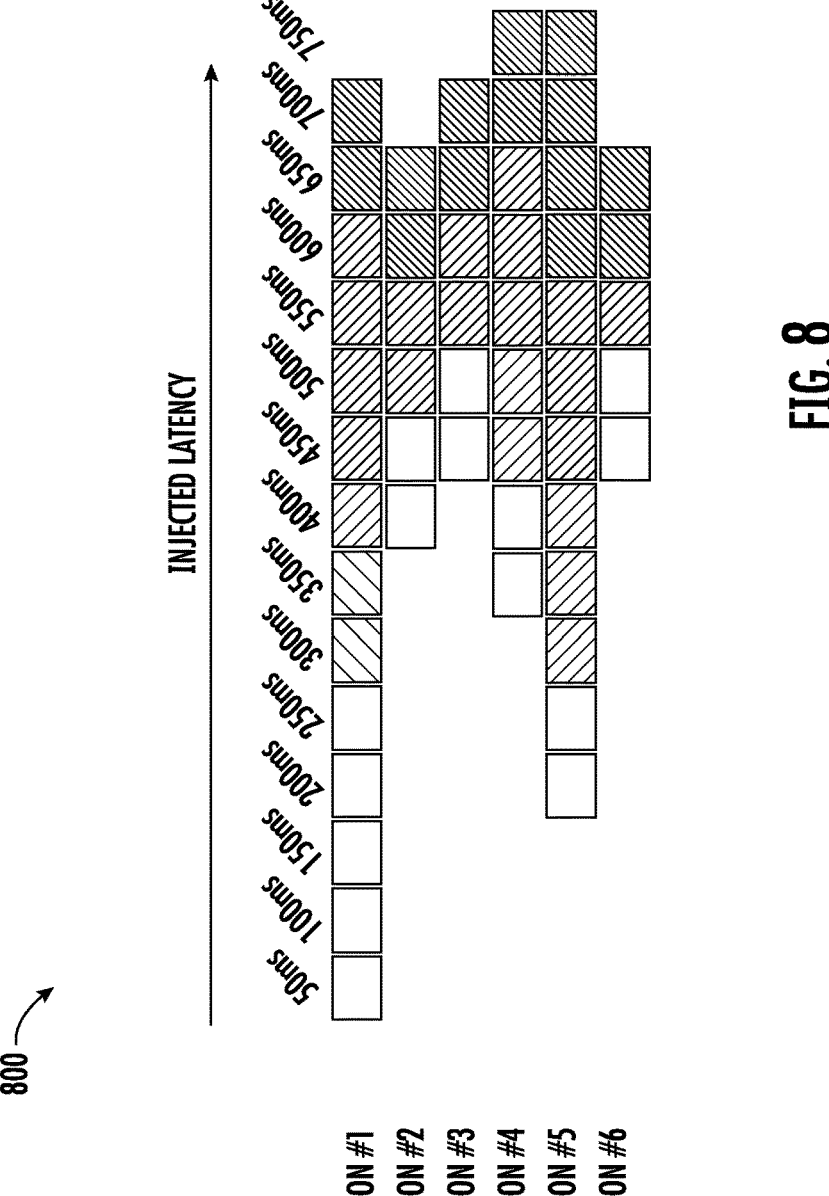

FIG. 8 illustrates an example of a search latency pattern (pattern 800) across consecutive evaluation sessions (e.g., session #1 through session #6) and associated QoE labels. Each square represents an impairment pattern, with the hashing matching the QoE label received from the user (e.g., on a scale illustratively including: "excellent", "good", "fair", "poor", and "bad", as shown). In the pattern 800, injected latency (as an example impairment) goes from 50 ms to 750 ms.

In particular, during a first evaluation session, the system may instruct the NIP to find the threshold for latency by emulating impairment tests in 50 ms intervals and only stop after receiving a few consecutive labels indicating poor QoE. If we take the example of Microsoft Exchange, which is known to be very tolerant to latency, this approach may result in many tests being run until poor QoE labels are finally received. Assume that threshold is 600 ms after the first run. The metric used to determine the right threshold may be the percentage of labels with value X (e.g., percentage of poor or bad thresholds) according to the business objective. In a second run, the SCM can already use the feedback from the first session to narrow down the search space to only a few tests around 600 ms leading to optimized session duration.

In practice, the search space has multiple dimensions (e.g., loss, latency, jitter, maximum throughput), and additional techniques can be used to avoid querying an unreasonably large number of labels from a user in a single session. A multi-dimensional histogram or density estimate (possibly approximated using techniques such as locality-sensitive hashing) can be used as a source of uncertainty on regions of the search space, to query QoE labels for impairment configurations for which the lowest number of labels have previously been obtained. Alternatively, a previously trained machine learning model from the policy recommendation engine (detailed below) can be used, and can provide more focused uncertainty estimates. For instance, there might be few labels in regions of the search space corresponding to almost no impairment, but collecting more may not be useful to start with when modeling shows with certainty that QoE is satisfactory in those regions.

The policy recommendation engine 512 (or policy recommendation engine 612), or simply "PRE" is tasked with ingesting the QoE labels and application telemetry collected by the SCM component and providing policy configuration recommendations for each application of interest.

In one embodiment, simple heuristics can be used to find the highest SLA thresholds which can be used to achieve the target QoE score as defined by the network administrator. For instance, the space of impairment parameters can be bucketized, and the average or median QoE score can be computed for each bucket. Buckets are then visited in reverse lexicographical order until a bucket with an acceptable QoE score is identified.

However, this type of method suffers from various drawbacks:

It requires enough samples in most buckets to make sense.

It cannot account for latent variables—e.g., in a given situation, a user providing a label at a moment with low overall traffic on the network might have had a good experience, while another user might have provided a conflicting label at a different moment of the day.

In another embodiment, a Machine Learning (ML) model can be used. For example, a supervised ML model can be built as follows for the task:

For each QoE label provided by a user, a feature vector can be constructed from the corresponding impairment parameters, but also any additional contextual information that may help understanding why two sessions with the same impairments, for the same application and from the same site, may be rated differently by end users. For examples, the following contextual information can be used: date and time, SD-WAN site-level router and link metrics (e.g., link utilization), details about the type of task undertaken by the user when available (e.g., loading up a large slide deck with videos may not be equivalent to loading up a small slide deck with a couple empty slides), and about actions actually carried out by the users (e.g., users may sometime misunderstand instructions and not actually do what is required from them, which can bias results if not accounted for).

A model is then trained to map feature vectors to QoE scores. Separate models can be trained for each task or application. When relevant, a model with monotonicity constraints can be used: such a model will provide estimates where, say, increasing the latency will only lead to a lower QoE score. This can be used when such assumptions appear realistic to better remove noise or influence from latent factors.

The posterior distribution of the model is examined to identify maximal impairment values that can satisfy the QoE score requirements with high probability. This can be achieved through sampling when using probabilistic sampling methods.

In general, there may be multiple impairment values that correspond to the highest QoE score: e.g., [latency=300 ms, loss=20%], [latency=200 ms, loss=30%], [latency=100 ms, loss=50%] may all lead to the same QoE score, leading to a Pareto front of equally optimal solutions from the perspective of the QoE ratings. Rules crafted by subject-matter experts or by the network administrator can be used to break down such ties based on what constraints may be easier to configure or to obtain from the service provider.

Notably, while the QoE score is very important objective, it represents only one dimension of interest. In another embodiment, the PRE can make use of a more sophisticated multi-objective ML model which can be designed to account for additional dimensions besides user QoE. Indeed, in practice, network administrators will often be interested in optimizing the resulting policy configuration against several other objectives such as:

Network stability/churn: aggressive configuration timers can lead to frequent traffic rerouting events which is an undesirable behavior in a real network. Increased stability, even at the cost of a slightly lower overall QoE score is often favored.

Productivity gain (or loss): Application telemetry connected from user monitoring agents such as an application performance monitoring (APM) endpoint agent or received from application backends via APM solutions can be leveraged to understand the impact of various types of impairments on user productivity (e.g., a time it takes users to complete certain tasks or workflows). For applications, such as customer relationship management (CRM) or ticketing systems where users may often repeat the same workflow hundreds of times per day, even a marginal increase in the time it takes to complete each task may significantly impact overall productivity.

Cost of transport circuits: restrictive SLA timers may mean that only circuits built on higher cost technologies, such as dark fibers, MPLS, or leased lines, qualify to forward user traffic. A policy that includes lower cost circuits where possible may be preferred.

Notably, various ML techniques can be used, such as, for example, using multi-variate regression, separate models for each dimension, and so on.

The output of the PRE may illustratively take the form of a QOE policy configuration recommendation. FIG. 9 illustrates an example of a QOE policy configuration recommendation 900, such as for an SD-WAN environment. For instance, as shown, an example policy may comprise:

```
bfd app-route multiplier 6
bfd app-route poll-interval 30000
sla-class SalesforceSLA loss 5
  latency 15O
  jitter 1OO
  !
app-route-policy ApplicationAwareRouting
  sequence 11
  match
  app-list Salesforce
  !
  action
  sla-class SalesforceSLA
  !
  !
```

In the above example of the QOE policy configuration recommendation 900, the PRE recommends an SLA profile of 5% packet loss, 150 ms of latency and 100 ms of jitter for a Salesforce application. The measured values of each KPI should be averaged over a 30-second interval and the system should react if the thresholds are exceeded for more than 3 minutes.

In another embodiment, the techniques herein allow for customized policies per region. That is, the system may determine that users in different region may have a different level of tolerance, which is a dimension very difficult to capture without the techniques herein.

Lastly, the user interface 514 (or UI 614) allows the network administrator to inspect the outputs of the policy recommendation engine. (Alternatively the outputs may be sent for an automated review and/or reaction by an intelligent system.) Additionally, the UI can be used to define constraints related to the operation of the system such as:

applications of interest, evaluation session duration and frequency, number of users that should be solicited for feedback, time of day when sessions should be run, geographical location or specific sites that should be excluded, objectives for policy optimization (QoE, network stability, etc.), and so on.

Figure 10:
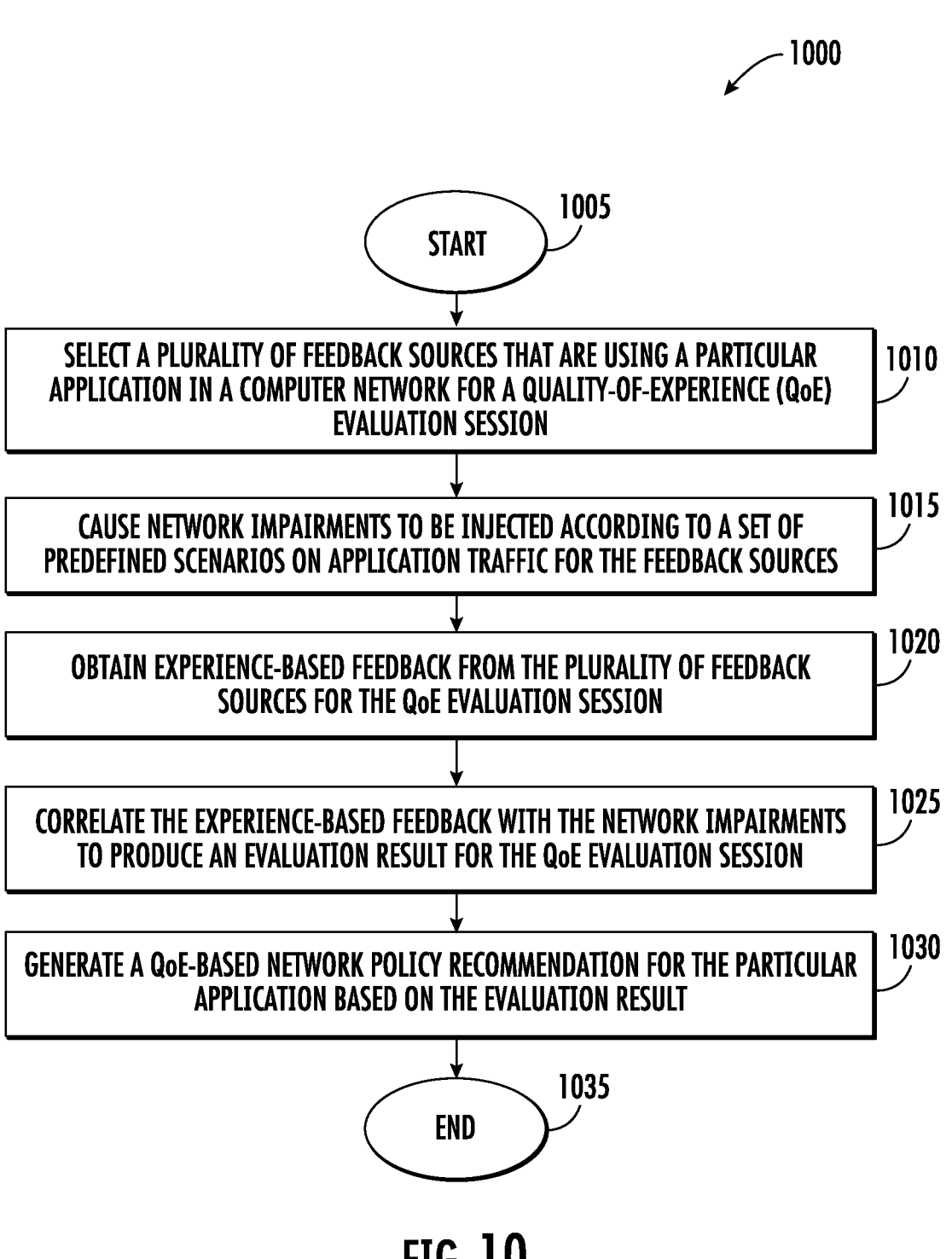
FIG. 10 illustrates an example procedure for a QoE policy engine for custom applications based on feedback.

In closing, FIG. 10 illustrates an example simplified procedure for quality of experience (QoE) policy engine for custom applications based on feedback in accordance with one or more embodiments described herein. For example, a non-generic, specifically configured device (e.g., device 200, an apparatus) may perform procedure 1000 by executing stored instructions (e.g., process 248). The procedure 1000 may start at step 1005, and continues to step 1010, where, as described in greater detail above, the techniques herein select a plurality of feedback sources that are using a particular application in a computer network for a quality-of-experience (QoE) evaluation session. For example, the sources may be a set of users that have historical usage of the particular application for the plurality of feedback sources. In certain implementations, the techniques herein may notify a set of candidate users about the QoE evaluation session, and then may select a particular set of participant users from the set of candidate users that have agreed to participate in the QoE evaluation session as the plurality of feedback sources.

In step 1015, the techniques herein may cause one or more network impairments to be injected according to a set of predefined scenarios on application traffic for the plurality of feedback sources. As noted, such impairments may be injected based on redirecting the application traffic for the plurality of feedback sources using the particular application via one or more network devices (e.g., network proxy, NIP, etc.) configured to inject the one or more network impairments according to the set of predefined scenarios on the application traffic. Also, in one implementation, the techniques herein may first determine where within the computer network to configure the one or more network devices based on one or more factors selected from: manual configuration; dynamic configuration based on first locations with feedback indicating a poor quality-of-experience measure for the particular application; dynamic configuration based on second locations raising network alarms without feedback indications of a poor quality-of-experience measure; and so on.

As also described in greater detail above, the one or more network impairments to be injected according to the set of predefined scenarios may comprise one or more impairment patterns selected from a group consisting of: a single isolated metric impairment pattern; an impairment pattern for a combination of a plurality of metrics; a continuous time distribution pattern; a seasonal time distribution pattern; and a random time distribution pattern. Moreover, the one or more network impairments to be injected according to the set of predefined scenarios may be based on one or more constraints (e.g., received from a network admin or otherwise) selected from a group consisting of: one or more particular applications to evaluate; duration of the QoE evaluation session; frequency of the QoE evaluation session; a number of feedback sources for the plurality of feedback sources; a time of day for the QoE evaluation session; a geographical location for the QoE evaluation session; one or more specific sites that should be excluded from the QoE evaluation session; a minimum desired QoE measure; and one or more objectives for policy optimization.

As also mentioned above, the techniques herein may measure unaltered network conditions for the particular application in the computer network prior to the QoE evaluation session in order to determine, based on the unaltered network conditions prior to the QoE evaluation session, the one or more network impairments to be injected in order to meet the set of predefined scenarios. For instance, assuming a latency of 100 ms already exists, and the goal impairment is 250 ms, only 150 ms of impairment needs to be added.

In step 1020, the techniques herein may then obtain experience-based feedback from the plurality of feedback sources for the quality-of-experience evaluation session, as described in greater detail above. Also, in one implementation, the techniques herein may perform a subsequent information inquiry with one or more particular feedback sources of the plurality of feedback sources responsive to comparatively low experience-based feedback for the QoE evaluation session from the one or more particular feedback sources.

In step 1025, the techniques herein may now correlate the experience-based feedback with the one or more network impairments (e.g., with the network telemetry caused by the impairments or just based on the impairments themselves) to produce an evaluation result for the QoE evaluation session (e.g., a report of what impairments resulted in different QoE assessments).

Note that in one implementation as described above, the set of predefined scenarios may comprise increased impairment intervals that are executed until reaching a given number of consecutive feedback indications of a poor QoE measure. In such an implementation, the set of predefined scenarios may further comprise a subsequent set of increased impairment intervals that start at a higher level of impairment than a previous set of increased impairment intervals based on when the previous set of increased impairment intervals reached the given number of consecutive feedback indications of the poor QoE measure.

In step 1030, the techniques herein may then generate a QoE-based network policy recommendation for the particular application based on the evaluation result. For instance, the policy recommendation may be based on defining application-specific service level agreement (SLA) threshold values in one embodiment. In one embodiment, the QoE evaluation session is region-specific, and the QoE-based network policy recommendation for the particular application is region-specific. Moreover, in one implementation, the techniques herein may also focus on optimizing the QoE-based network policy recommendation for the particular application against one or more defined objectives in addition to QoE.

Notably, as described in greater detail above, the techniques herein may also use a machine learning model to find extrema (maximum and minimum values) for the application-specific SLA threshold values that still achieve a target QoE measure for the particular application with high probability based on the evaluation result. Also, in one implementation, the techniques herein may add contextual information to the machine learning model selected from a group consisting of: date and time; site-level router and link metrics; a type of task undertaken by the plurality of feedback sources; actions carried out by the plurality of feedback sources; and so on. This may be particularly useful in the event of a need to resolve why feedback mismatches with expected predictions (e.g., the same telemetry with different QoE feedback, etc.).

Procedure 1000 may end at step 1035, notably with an admin being presented the policy recommendation (e.g., on a UI), or else by auto-submitting the policy recommendation into network policy control devices in the network for configuration, accordingly.

It should be noted that while certain steps within the procedures above may be optional as described above, the steps shown in the procedures above are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures may have been described separately, certain steps from each procedure may be incorporated into each other procedure, and the procedures are not meant to be mutually exclusive.

In some implementations, an illustrative apparatus herein may comprise: one or more network interfaces to communicate with a network; a processor coupled to the one or more network interfaces and configured to execute one or more processes; and a memory configured to store a process that is executable by the processor, the process comprising: causing, for a quality-of-experience evaluation session, one or more network impairments to be injected according to a set of predefined scenarios on application traffic for a plurality of feedback sources that are using a particular application in a computer network; obtaining experience-based feedback from the plurality of feedback sources for the quality-of-experience evaluation session; correlating the experience-based feedback with the one or more network impairments to produce an evaluation result for the quality-of-experience evaluation session; and generating a quality-of-experience-based network policy recommendation for the particular application based on the evaluation result.

In still other implementations, a tangible, non-transitory, computer-readable medium storing program instructions that cause a device to execute a process comprising: causing, for a quality-of-experience evaluation session, one or more network impairments to be injected according to a set of predefined scenarios on application traffic for a plurality of feedback sources that are using a particular application in a computer network; obtaining experience-based feedback from the plurality of feedback sources for the quality-of-experience evaluation session; correlating the experience-based feedback with the one or more network impairments to produce an evaluation result for the quality-of-experience evaluation session; and generating a quality-of-experience-based network policy recommendation for the particular application based on the evaluation result.

The techniques described herein, therefore, provide for quality of experience (QoE) policy engine for custom applications based on feedback. In particular, though application QoE has been studied based on evaluating user experience against a set of statically defined network impairments that are emulated in controlled laboratory environments (i.e., and not being representative of real enterprise environments), the techniques herein specifically identify optimal SLA thresholds that can be used to make policy recommendations for application routing, particularly with applicability in the real world, and without limitation in scope (e.g., not being limited to video and/or voice). Said differently, the techniques herein provide a generalized methodology for evaluating QoE for applications in enterprise environments, beyond just voice and video, by using online (real-time) sessions conducted by users with prior domain knowledge (e.g., real user feedback). This approach can be used for any type of enterprise application, even custom and in-house developed apps where prior domain knowledge (common workflows, procedures, etc.) may be required. Also, users provide feedback from evaluating application behavior in real-time while performing well-known tasks all while using their own environment and tools as opposed to reviewing an offline media recording.

Illustratively, the techniques described herein may be performed by hardware, software, and/or firmware, (e.g., an "apparatus") such as in accordance with the QoE policy engine process, process 248, e.g., a "method"), which may include computer-executable instructions executed by the processor(s) 220 to perform functions relating to the techniques described herein, e.g., in conjunction with corresponding processes of other devices in the computer network as described herein (e.g., on agents, controllers, computing devices, servers, etc.). In addition, the components herein may be implemented on a singular device or in a distributed manner, in which case the combination of executing devices can be viewed as their own singular "device" for purposes of executing the process (e.g., process 248).

While there have been shown and described illustrative implementations above, it is to be understood that various other adaptations and modifications may be made within the scope of the implementations herein. For example, while certain implementations are described herein with respect to certain types of networks in particular, the techniques are not limited as such and may be used with any computer network, generally, in other implementations. Moreover, while specific technologies, protocols, architectures, schemes, workloads, languages, etc., and associated devices have been shown, other suitable alternatives may be implemented in accordance with the techniques described above. In addition, while certain devices are shown, and with certain functionality being performed on certain devices, other suitable devices and process locations may be used, accordingly. Also, while certain embodiments are described herein with respect to using certain models for particular purposes, the models are not limited as such and may be used for other functions, in other embodiments.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method, comprising:
   redirecting live, actual application traffic from users within an enterprise environment to one or more network proxies;
   causing, by a device and for a quality-of-experience evaluation session, one or more network impairments to be injected into the one or more network proxies according to a set of predefined scenarios on the live, actual application traffic for a plurality of feedback sources that are using a particular application in a computer network within the enterprise environment, wherein the feedback sources comprise the users;
   obtaining, by the device, explicit, user-provided experience-based feedback in response to prompts issued in real-time after each of the set of predefined scenarios executed during the quality-of-experience evaluation session;
   correlating, by the device, each item of the explicit, user-provided experience-based feedback with a corresponding predefined impairment scenario and its impairment parameters to produce an evaluation result comprising application-specific service level agreement threshold values for the quality-of-experience evaluation session; and
   generating, by the device, a quality-of-experience-based network policy recommendation for the particular application based on the evaluation result.

2. The method of claim 1, wherein the one or more network impairments to be injected according to the set of predefined scenarios comprise one or more impairment patterns selected from a group consisting of: a single isolated metric impairment pattern; an impairment pattern for a combination of a plurality of metrics; a continuous time distribution pattern; a seasonal time distribution pattern; and a random time distribution pattern.

3. The method of claim 1, further comprising:
   measuring unaltered network conditions for the particular application in the computer network prior to the quality-of-experience evaluation session; and
   determining, based on the unaltered network conditions prior to the quality-of-experience evaluation session, the one or more network impairments to be injected in order to meet the set of predefined scenarios.

4. The method of claim 1, further comprising:

performing a subsequent information inquiry with one or more particular feedback sources of the plurality of feedback sources responsive to comparatively low experience-based feedback for the quality-of-experience evaluation session from the one or more particular feedback sources.

5. The method of claim 1, further comprising:

selecting a set of users that have historical usage of the particular application for the plurality of feedback sources.

6. The method of claim 1, further comprising:

notifying a set of candidate users about the quality-of-experience evaluation session; and selecting a particular set of participant users from the set of candidate users that have agreed to participate in the quality-of-experience evaluation session as the plurality of feedback sources.

7. The method of claim 1, wherein redirecting comprises:

redirecting the live, actual application traffic for the plurality of feedback sources using the particular application via one or more network devices configured to inject the one or more network impairments according to the set of predefined scenarios on the actual application traffic.

8. The method of claim 7, further comprising:

determining where within the computer network to configure the one or more network devices based on one or more factors selected from: manual configuration; dynamic configuration based on first locations with feedback indicating a poor quality-of-experience measure for the particular application; and dynamic configuration based on second locations raising network alarms without feedback indications of a poor quality-of-experience measure.

9. The method of claim 1, wherein the set of predefined scenarios comprises increased impairment intervals that are executed until reaching a given number of consecutive feedback indications of a poor quality-of-experience measure.

10. The method of claim 9, wherein the set of predefined scenarios further comprises a subsequent set of increased impairment intervals that start at a higher level of impairment than a previous set of increased impairment intervals based on when the previous set of increased impairment intervals reached the given number of consecutive feedback indications of the poor quality-of-experience measure.

11. The method of claim 1, wherein generating comprises:

defining application-specific service level agreement threshold values.

12. The method of claim 11, further comprising:

using a machine learning model to find extrema for the application-specific service level agreement threshold values that still achieve a target quality-of-experience measure for the particular application with high probability based on the evaluation result.

13. The method of claim 12, further comprising:

adding contextual information to the machine learning model selected from a group consisting of: date and time; site-level router and link metrics; a type of task undertaken by the plurality of feedback sources; and actions carried out by the plurality of feedback sources.

14. The method of claim 1, further comprising:

optimizing the quality-of-experience-based network policy recommendation for the particular application against one or more defined objectives in addition to quality-of-experience.

15. The method of claim 1, wherein the quality-of-experience evaluation session is region-specific, and wherein the quality-of-experience-based network policy recommendation for the particular application is region-specific.

16. The method of claim 1, wherein the one or more network impairments to be injected according to the set of predefined scenarios are based on one or more constraints selected from a group consisting of: one or more particular applications to evaluate; duration of the quality-of-experience evaluation session; frequency of the quality-of-experience evaluation session; a number of feedback sources for the plurality of feedback sources; a time of day for the quality-of-experience evaluation session; a geographical location for the quality-of-experience evaluation session; one or more specific sites that should be excluded from the quality-of-experience evaluation session; a minimum desired quality-of-experience measure; and one or more objectives for policy optimization.

17. An apparatus, comprising:

one or more network interfaces to communicate with a network;

a processor coupled to the one or more network interfaces and configured to execute one or more processes; and a memory configured to store a process that is executable by the processor, the process comprising:

redirecting live, actual application traffic from users within an enterprise environment to one or more network proxies;

causing, by a device and for a quality-of-experience evaluation session, one or more network impairments to be injected into the one or more network proxies according to a set of predefined scenarios on the live, actual application traffic for a plurality of feedback sources that are using a particular application in a computer network within the enterprise environment, wherein the feedback sources comprise the users;

obtaining, by the device, explicit, user-provided experience-based feedback in response to prompts issued in real-time after each of the set of predefined scenarios executed during the quality-of-experience evaluation session;

correlating, by the device, each item of the explicit, user-provided experience-based feedback with a corresponding predefined impairment scenario and its impairment parameters to produce an evaluation result comprising application-specific service level agreement threshold values for the quality-of-experience evaluation session; and generating, by the device, a quality-of-experience-based network policy recommendation for the particular application based on the evaluation result.

18. The apparatus of claim 17, the process further comprising:

measuring unaltered network conditions for the particular application in the computer network prior to the quality-of-experience evaluation session; and determining, based on the unaltered network conditions prior to the quality-of-experience evaluation session, the one or more network impairments to be injected in order to meet the set of predefined scenarios.

19. The apparatus of claim 17, wherein causing comprises:

redirecting the application traffic for the plurality of feedback sources using the particular application via one or more network devices configured to inject the one or more network impairments according to the set of predefined scenarios on the application traffic.

20. A tangible, non-transitory, computer-readable medium storing program instructions that cause a device to execute a process comprising:

redirecting live, actual application traffic from users within an enterprise environment to one or more network proxies;

causing, by a device and for a quality-of-experience evaluation session, one or more network impairments to be injected into the one or more network proxies according to a set of predefined scenarios on the live, actual application traffic for a plurality of feedback sources that are using a particular application in a computer network within the enterprise environment, wherein the feedback sources comprise the users;

obtaining, by the device, explicit, user-provided experience-based feedback in response to prompts issued in real-time after each of the set of predefined scenarios executed during the quality-of-experience evaluation session;

correlating, by the device, each item of the explicit, user-provided experience-based feedback with a corresponding predefined impairment scenario and its impairment parameters to produce an evaluation result comprising application-specific service level agreement threshold values for the quality-of-experience evaluation session; and generating, by the device, a quality-of-experience-based network policy recommendation for the particular application based on the evaluation result.

* * * * *